United States Patent
Elg et al.

(10) Patent No.: US 9,918,015 B2
(45) Date of Patent: Mar. 13, 2018

(54) EXPOSURE CONTROL USING DEPTH INFORMATION

(71) Applicant: Sony Corporation, Tokyo (JP)

(72) Inventors: Johannes Elg, Lund (SE); Fredrik Mattisson, Lund (SE); Jonas Gustavsson, Lund (SE); Daniel Linåker, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 442 days.

(21) Appl. No.: 14/389,791

(22) PCT Filed: Mar. 11, 2014

(86) PCT No.: PCT/IB2014/059610
§ 371 (c)(1),
(2) Date: Oct. 1, 2014

(87) PCT Pub. No.: WO2015/136323
PCT Pub. Date: Sep. 17, 2015

(65) Prior Publication Data
US 2016/0261783 A1 Sep. 8, 2016

(51) Int. Cl.
*H04N 5/235* (2006.01)
*H04N 5/222* (2006.01)
*H04N 13/02* (2006.01)

(52) U.S. Cl.
CPC ......... *H04N 5/2353* (2013.01); *H04N 5/2226* (2013.01); *H04N 13/0271* (2013.01)

(58) Field of Classification Search
CPC . H04N 5/2353; H04N 13/0271; H04N 5/2226
See application file for complete search history.

(56) References Cited

U.S. PATENT DOCUMENTS

| | | | |
|---|---|---|---|
| 2005/0157204 A1* | 7/2005 | Marks | H04N 5/272 348/370 |
| 2006/0256229 A1* | 11/2006 | Wernersson | H04N 5/23212 348/348 |
| 2009/0180771 A1 | 7/2009 | Liu et al. | |
| 2009/0297061 A1* | 12/2009 | Mareachen | G06T 11/00 382/285 |
| 2011/0097067 A1* | 4/2011 | Osawa | G03B 7/097 396/165 |

(Continued)

OTHER PUBLICATIONS

International Search Report and Written Opinion; dated Aug. 27, 2014; issued in International Patent Application No. PCT/IB2014/059610.

(Continued)

*Primary Examiner* — Gevell Selby
(74) *Attorney, Agent, or Firm* — James C. Edwards; Moore & Van Allen PLLC

(57) ABSTRACT

The invention is directed to exposure control in a camera. An exemplary method comprises determining depth information associated with a portion of an image frame; obtaining exposure data associated with the portion of the image frame; and controlling an amount of exposure for the portion of the image frame based on the depth information and the exposure data.

10 Claims, 2 Drawing Sheets

(56) References Cited

U.S. PATENT DOCUMENTS

2012/0320253 A1* 12/2012 Park .................. H04N 5/23212
                                                  348/345
2013/0044222 A1*  2/2013 Tardif ................. H04N 17/002
                                                  348/187
2013/0307938 A1* 11/2013 Kim .................... H04N 13/04
                                                  348/47

OTHER PUBLICATIONS

International Preliminary Report on Patentability; dated Sep. 22, 2016; issued in International Patent Application No. PCT/IB2014/059610.

* cited by examiner

EXPOSURE CONTROL USING DEPTH INFORMATION

BACKGROUND ART

There are several techniques for generating light measurements for a scene to be captured by a camera and for selecting the desired exposure for the scene. These techniques may be referred to as metering modes. However, these techniques fail in certain situations. The present invention is directed to addressing those situations.

SUMMARY

Embodiments of the invention are directed to a system, method, and computer program product for exposure control in a camera. An exemplary method comprises: determining depth information associated with a portion of an image frame; obtaining exposure data associated with the portion of the image frame; and controlling an amount of exposure for the portion of the image frame based on the depth information and the exposure data. As used herein, the depth information comprises a distance from the camera to one or more objects in the portion of the image frame.

In some embodiments, the portion of the image frame is associated with an object.

In some embodiments, the portion of the image frame is associated with at least two objects.

In some embodiments, the portion of the image frame is selected by a user of the camera.

In some embodiments, the depth information is associated with a depth map.

In some embodiments, the depth information enables determination of two-dimensional data associated with the portion of the image frame.

In some embodiments, the exposure data is associated with histogram data.

In some embodiments, obtaining the exposure data comprises measuring an amount of light associated with the portion of the image frame.

In some embodiments, the portion of the image frame is associated with an object located closest to the camera when compared to other objects in the image frame.

In some embodiments, the portion of the image frame is associated with an object located farthest away from the camera when compared to other objects in the image frame.

In some embodiments, controlling the amount of exposure comprises increasing the amount of exposure or decreasing the amount of exposure.

In some embodiments, the camera comprises an array camera, a stereoscopic camera, or a time-of-flight camera.

In some embodiments, the camera is part of a mobile device.

In some embodiments, a system is provided for exposure control. The system comprises a camera; a memory; a processor; and a module, stored in the memory, executable by the processor, and configured to: determine depth information associated with a portion of an image frame; obtain exposure data associated with the portion of the image frame; and control an amount of exposure for the portion of the image frame based on the depth information and the exposure data.

In some embodiments, a computer program product is provided for exposure control. The computer program product comprises a non-transitory computer-readable medium comprising code configured to: determine depth information associated with a portion of an image frame; obtain exposure data associated with the portion of the image frame; and control an amount of exposure for the portion of the image frame based on the depth information and the exposure data.

BRIEF DESCRIPTION OF DRAWINGS

Figure 1:
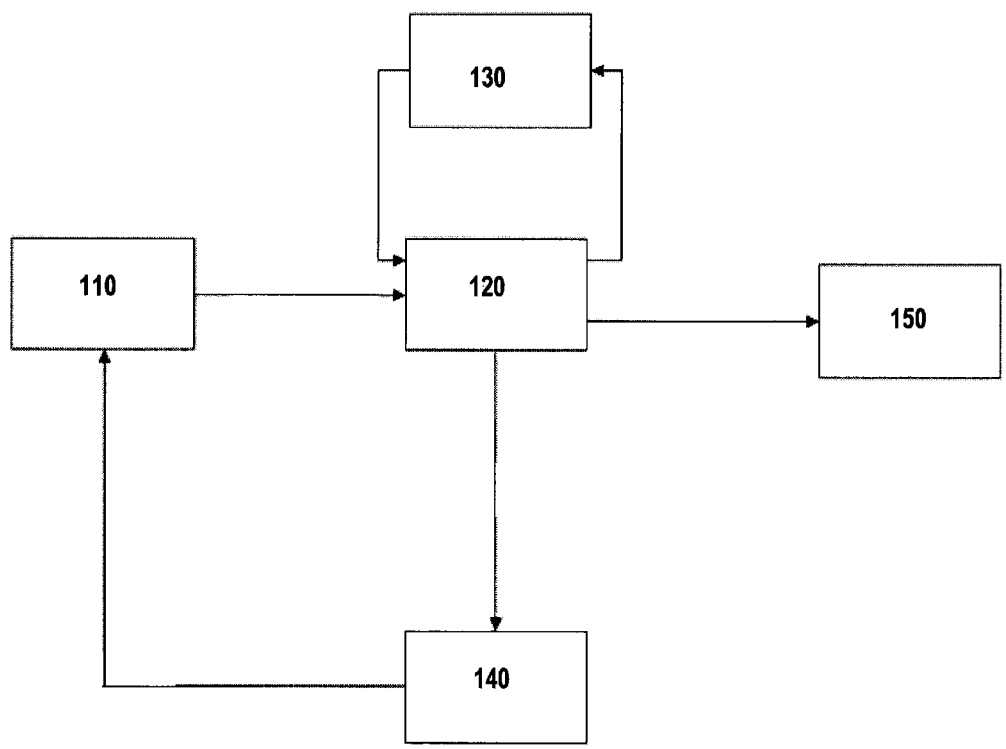
Figure 2:
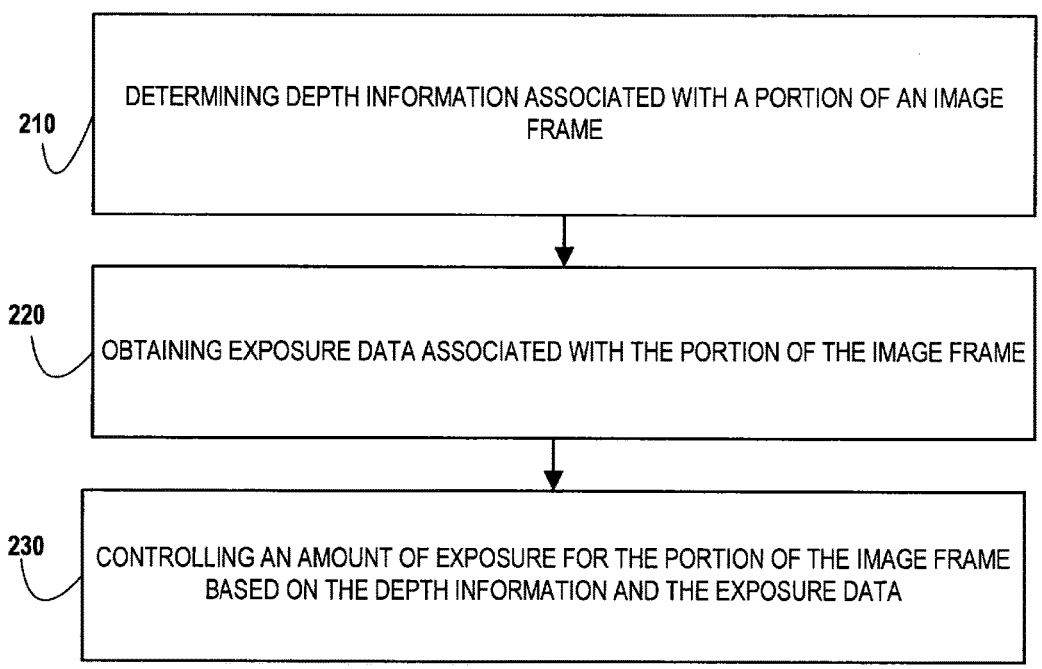

Having thus described embodiments of the invention in general terms, reference will now be made to the accompanying drawings, where:

FIG. 1 illustrates a block diagram for exposure control using a camera, in accordance with embodiments of the present invention; and FIG. 2 illustrates a process flow for exposure control using a camera, in accordance with embodiments of the present invention.

DESCRIPTION OF EMBODIMENTS

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

The present invention is directed to using depth information associated with an object in a scene for the purposes of light metering and exposure control. Light metering and exposure control are important functions of a camera. As used herein, light metering refers to measuring the amount of light in a scene. As used herein, exposure control refers to controlling the amount of light that reaches various parts of a photographic sensor. Since the dynamic range of a camera may not be wide enough to control exposure, a user of the camera needs to prioritize or decide which parts of a scene should have adequate or optimal exposure (e.g., equal to or greater than a first exposure level and equal to and/or less than a second exposure level) and which parts of the scene are underexposed (e.g., less than the first exposure level or less than a third exposure level which is less than the first exposure level) or overexposed (e.g., greater than a second exposure level or greater than a fourth exposure level which is greater than the second exposure level). As used herein, a camera comprises a photographic sensor to capture an image. The dynamic range of the camera (or the sensor comprised in the camera) is defined as the largest possible electrical signal that can be generated by the sensor divided by the smallest possible electrical signal that can be generated by the sensor.

There are several techniques for generating light measurements for a scene to be captured by a camera and for selecting the desired exposure for the scene. These techniques may be referred to as metering modes. However, these techniques fail in certain situations. For example, these techniques fail in the instance when a user wants to achieve optimal exposure on an object located closest to the camera regardless of where the object is located in the scene. The technique proposed by this invention is a "distance priority" metering mode.

An array camera enables determination of depth information associated with objects in a scene. The depth information associated with various objects in a scene may also be referred to as a depth map. The depth information associated with an object in a scene refers to the distance between the camera and the object in the scene. The depth information enables determination of two-dimensional (2D) image data associated with a scene. The 2D image data refers to the distances along the x-axis and y-axis between the various objects in the scene. The plane connecting the camera to each object in the scene is the z-axis.

Using the depth information, the camera enables selection of one or more parts of a scene. For example, the user may select the part of the scene located closest to the camera and perform light metering on that part of the scene. In some embodiments, the scene may comprise a single object, while in other embodiments, the scene may comprise more than one object. Using the depth map, a user of the camera can select (or a camera is configured to select) an object located closest to the camera. As used herein, an object refers to a single object or multiple objects. The camera performs light metering on the object and the part of the scene associated with the object. This increases the probability of achieving greater exposure on the foreground of the scene associated with the image captured using the camera. The example described herein is directed to prioritizing greater exposure for the foreground of the image rather than the background of the image. However, in other embodiments, the camera described herein enables a user to select exposure priority for a particular object in a scene or a particular distance from the camera, thereby prioritizing exposure for objects located at the particular distance from the camera.

A camera (or an image signal processor (ISP) located in a camera) described herein may generate a depth map for a frame that is going to be captured by the camera. Assuming that the user of the camera wants to achieve greater exposure for the object or part of the scene determined to be closest to camera when compared to the exposure for the object or part of the scene further away from the camera, this depth map for the frame is used to select which parts of the scene in the frame are determined to be closest to the camera. The depth information is then used by the ISP to obtain exposure data in the form of histograms for the parts of the scene in the frame determined to be closest to the camera. In some embodiments, the depth information is used by the ISP to obtain exposure data in the form of histograms for other parts of the scene in the frame as well (e.g., the parts of the scene not determined to be closest to the camera). The histogram information is then used by the ISP to determine the amount of exposure for the parts of the scene in the frame determined to be closest to the camera. In embodiments where the depth information is used by the ISP to obtain histogram exposure data for other parts of the scene in the frame as well, the histogram information is used to determine the amount of exposure for these other parts of the scene as well.

The invention is not limited to array cameras and may be implemented with any other types of cameras that enable determination of depth information associated with objects in a scene (e.g., stereoscopic cameras). As used herein, an array camera comprises several low resolution cameras (or sensors) that are arranged in a grid (e.g., a quadrilateral grid). As used herein, a low resolution camera is a camera that captures an image with a resolution less than a predetermined resolution. Each camera in the grid of cameras may substantially simultaneously capture an image from a different angle. In alternate embodiments, each camera may capture an image at a different time. Additionally, each camera captures an image using a single-colored filter (e.g., a red, green, or blue filter). When the images captured by each camera are edited together using functionality to determine depth information (parallax calculations) associated with the images and functionality to increase the resolution of the final image by interpolating the individual red, green, and blue images, a high resolution RGB (red green blue) image is obtained. These functions may be performed either after or substantially simultaneously with capturing an image using the array camera. These functions may be performed by the array camera or other computing devices in communication with the array camera.

In some embodiments, the camera may be a stereoscopic camera. A stereoscopic camera has more than one lens (e.g., two lenses) and more than one image sensor (e.g., two image sensors). Each image sensor is associated with a separate lens. Using multiple image sensor-lens pairs, a stereoscopic camera simulates human binocular vision and enables capture of three-dimensional images. The stereoscopic camera enables calculation of depth information associated with pixels in the image (i.e., distance of one or more objects in the image frame). In still other embodiments, the camera may be a time-of-flight camera that determines depth information associated with one or more objects in the image frame, and consequently the compensation distance, based on measuring the time of flight of a light signal between the camera and one or more objects in the image.

Referring now to FIG. 1, FIG. 1 illustrates a block diagram for exposure control using depth information. An array camera 110 capture raw image data, and transmits the raw image data to the ISP 120 located in the array camera. In some embodiments, the ISP 120 may be separate from the array camera and may be located in an external system. The ISP 120 obtains a depth map associated with a selected portion of an image frame. The array camera performs light metering 130 for the selected portion of the image frame. Additionally, the ISP 120 obtains exposure data 140 (e.g., histogram data) for the selected portion of the image frame based on the measurements associated with the light metering 130 step. The ISP 120 subsequently controls the exposure of the selected portion of the image frame based on the depth map information and the exposure data. The selected portion of the image frame (along with the rest of the image frame) is subsequently displayed 150 by a display located in the camera or an external display.

Referring now to the process flow of FIG. 2, FIG. 2 illustrates a process flow for exposure control in a camera (e.g., an array camera, a stereoscopic camera, etc.). In some embodiments, the camera is part of a mobile device (e.g., a mobile phone). At block 210, the process flow comprises determining depth information associated with a portion of an image frame. The portion of the image frame may be associated with an object or more than one object (e.g., at least two objects). The portion of the image frame is selected by a user of the camera. The depth information may be associated with a depth map and enables determination of two-dimensional data associated with the portion of the image frame. In some embodiments, the portion of the image frame is associated with an object located closest to the camera when compared to other objects in the image frame. In other embodiments, the portion of the image frame is associated with an object located farthest away from the camera when compared to other objects in the image frame.

At block 220, the process flow comprises obtaining exposure data associated with the portion of the image frame. The exposure data may be associated with histogram data. Obtaining the exposure data comprises measuring an amount of light associated with the portion of the image frame. At block 230, the process flow comprises controlling an amount of exposure for the portion of the image frame based on the depth information and the exposure data.

Controlling the amount of exposure comprises increasing the amount of exposure or decreasing the amount of exposure.

The invention is not limited to any particular types of devices containing cameras. Examples of such devices include portable or non-portable media devices, mobile phones or other mobile computing devices, mobile televisions, laptop computers, smart screens, tablet computers or tablets, portable desktop computers, e-readers, eyewear, scanners, standalone cameras, portable media devices, gaming devices, or other image-capturing devices, watches, bands (e.g., wristbands) or other wearable devices, or other portable or non-portable computing or non-computing devices.

Each device or system described herein is a computing device that comprises a camera, a processor, a memory, and a module stored in the memory, executable by the processor, and configured to perform the various processes described herein. Each processor described herein generally includes circuitry for implementing audio, visual, and/or logic functions. For example, the processor may include a digital signal processor device, a microprocessor device, and various analog-to-digital converters, digital-to-analog converters, and other support circuits. The processor may also include functionality to operate one or more software programs based at least partially on computer-executable program code portions thereof, which may be stored, for example, in a memory.

Each memory may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

In accordance with embodiments of the invention, the term "module" with respect to a system (or a device) may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electro-magnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

The invention claimed is:

1. A method for exposure control in a camera, the method comprising:
   generating a depth map for an image frame to be captured by the camera;
   determining, based on the depth map, one or more objects located either closest in distance to the camera or furthest in distance from the camera;
   selecting a portion of the image frame that includes the one or more objects closest in distance to the camera or furthest in distance from the camera;
   measuring an amount of light in the selected portion of the image frame;
   obtaining exposure data associated with the portion of the image frame based on the measured amount of light in the selected portion of the image frame; and
   controlling an amount of exposure only for the portion of the image frame based on depth information associated with the depth map and the exposure data.

2. The method of claim 1, wherein the portion of the image frame includes at least two objects determined, based on the depth map, to be closest in distance to the camera or furthest in distance from the camera.

3. The method of claim 1, wherein the portion of the image frame is selected by a user of the camera.

4. The method of claim 1, wherein the depth information enables determination of two-dimensional data associated with the portion of the image frame.

5. The method of claim 1, wherein the exposure data is associated with histogram data.

6. The method of claim 1, wherein controlling the amount of exposure comprises increasing the amount of exposure or decreasing the amount of exposure for the portion of the image frame.

7. The method of claim 1, wherein the camera comprises an array camera, a stereoscopic camera, or a time-of-flight camera.

8. The method of claim 1, wherein the camera is part of a mobile device.

9. A system for exposure control, the system comprising:
   a camera;
   a memory;
   a processor;
   a module, stored in the memory, executable by the processor, and configured to:
      generate a depth map for an image frame to be captured by the camera;
      determine, based on the depth map, one or more objects located either closest in distance to the camera or furthest in distance from the camera;
      select a portion of the image frame that includes the one or more objects closest in distance to the camera or furthest in distance from the camera;
      measure an amount of light in the selected portion of the image frame;
      obtain exposure data associated with the portion of the image frame based on the measured amount of light in the selected portion of the image frame; and
      control an amount of exposure only for the portion of the image frame based on depth information associated with the depth map and the exposure data.

10. A computer program product for exposure control, the computer program product comprising a non-transitory computer-readable medium comprising code configured to:
   generate a depth map for an image frame to be captured by the camera;
   determine, based on the depth map, one or more objects closets in distance to the camera;
   select a portion of the image frame that includes the one or more objects closest in distance to the camera or furthest in distance from the camera;
   measure an amount of light in the selected portion of the image frame;
   obtain exposure data associated with the portion of the image frame based on the measured amount of light in the selected portion of the image frame; and
   control an amount of exposure only for the portion of the image frame based on depth information associated with the depth map and the exposure data.

* * * * *